UNITED STATES PATENT OFFICE.

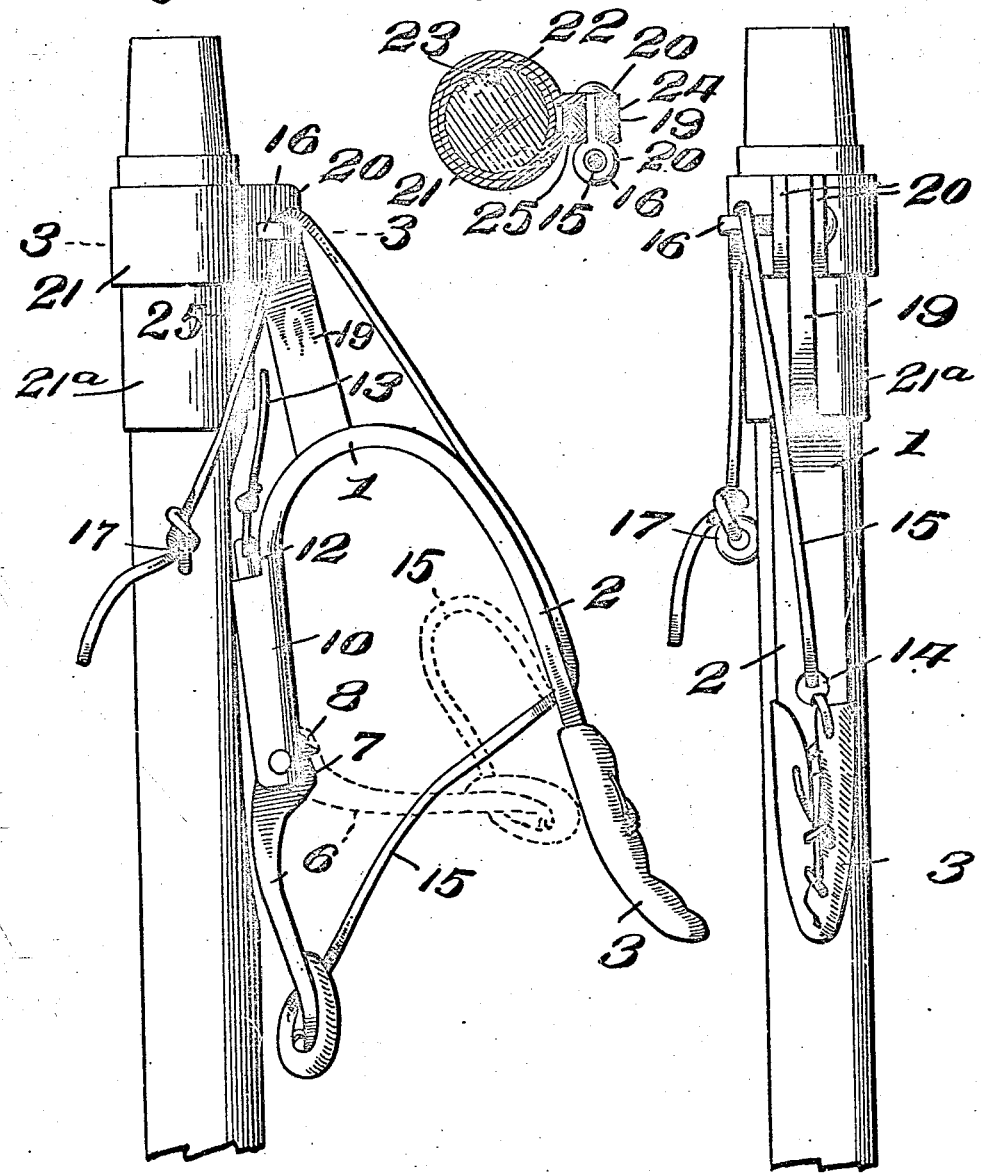

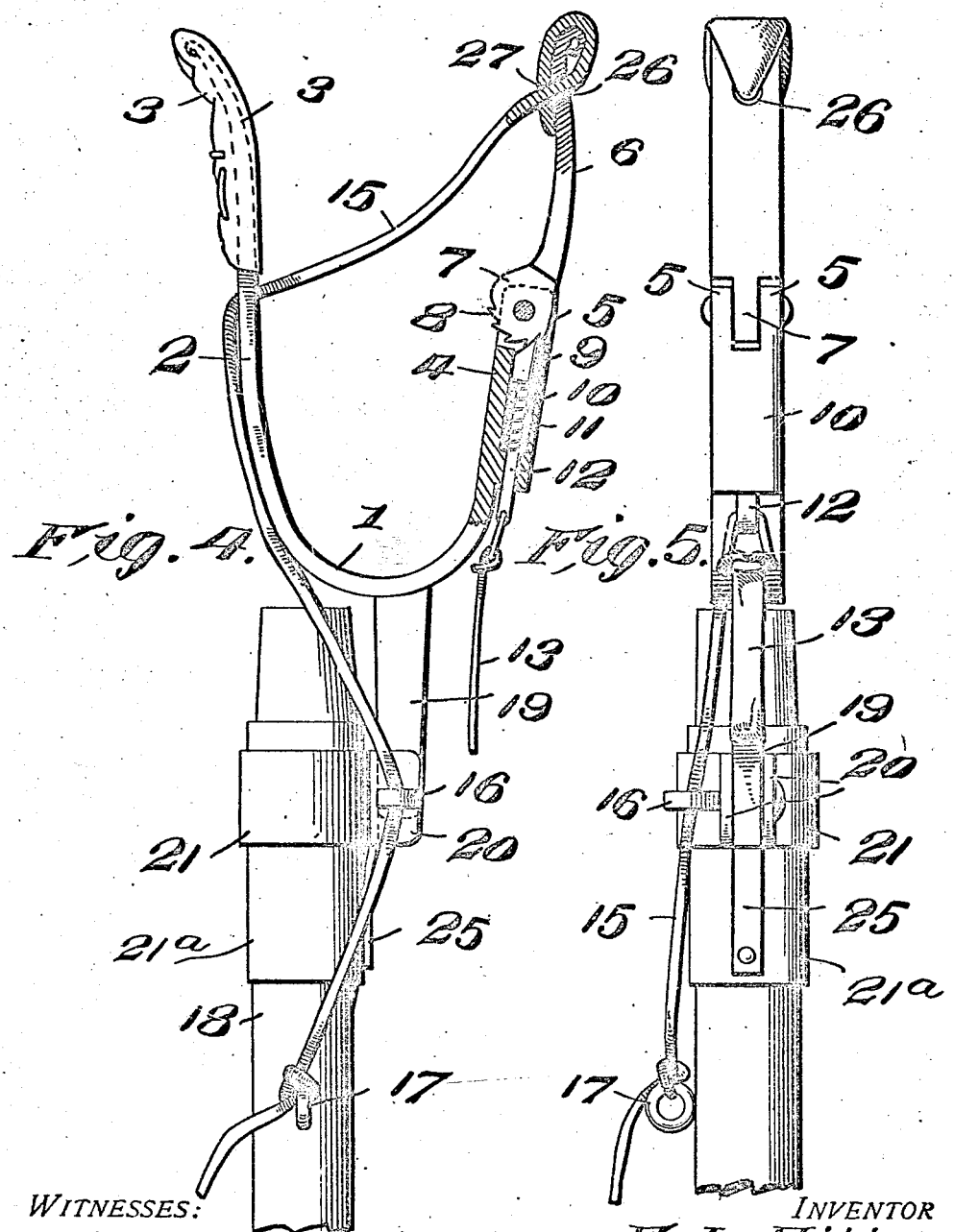

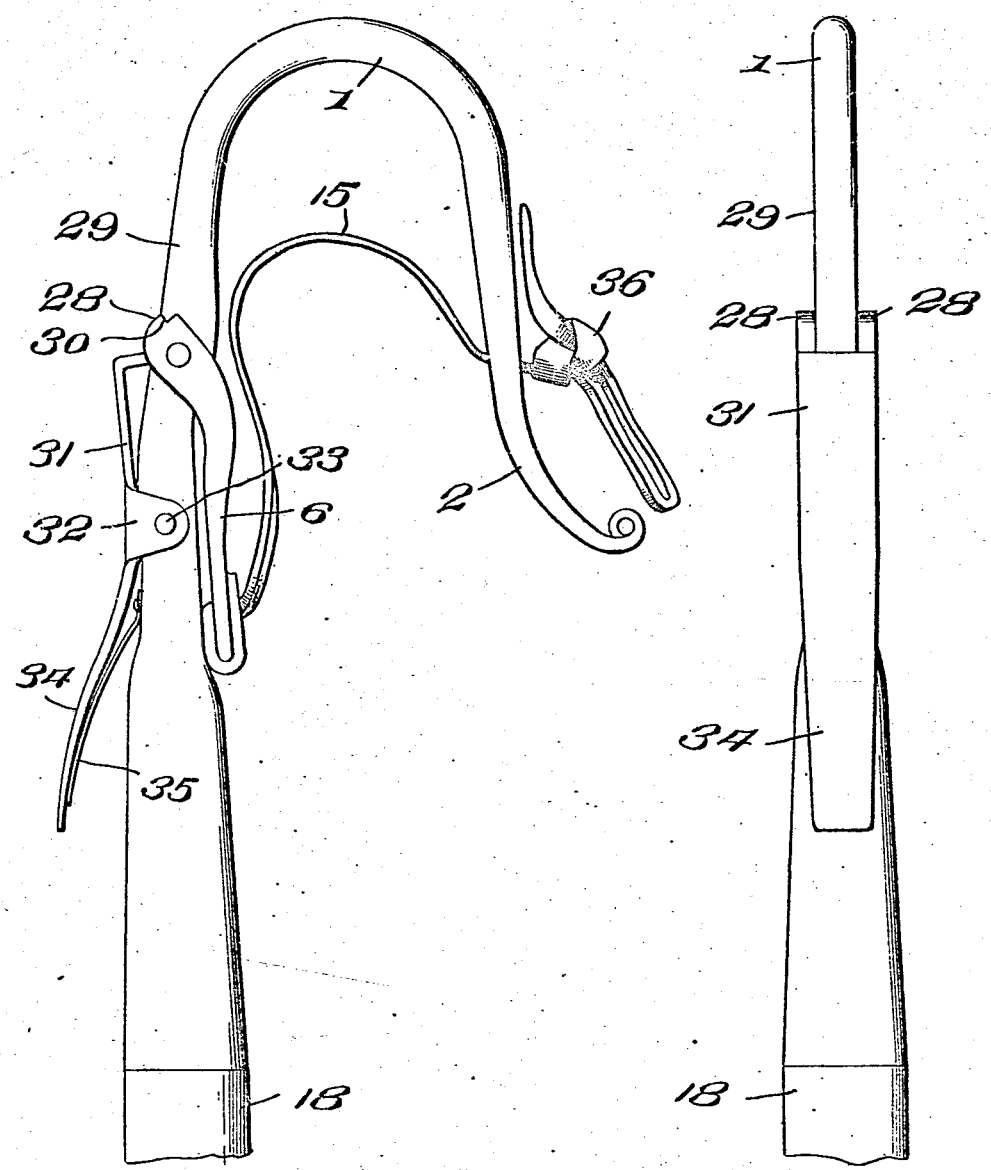

ELLET L. HITT, OF WEISER, IDAHO.

CATCHING AND HOLDING DEVICE.

No. 898,890.　　　Specification of Letters Patent.　　Patented Sept. 15, 1908.

Application filed October 26, 1907. Serial No. 399,368.

*To all whom it may concern:*

Be it known that I, ELLET L. HITT, a citizen of the United States, residing at Weiser, in the county of Washington and State of Idaho, have invented certain new and useful Improvements in Catching and Holding Devices; and I do hereby declare the following to be a full, clear, and exact description of the invention, such as will enable others skilled in the art to which it appertains to make and use the same.

My invention relates to new and useful improvements in catching and holding devices and more particularly to that class adapted to be used in catching animals and my object is to provide means for automatically securing the catcher to the limb of an animal.

A further object is to provide means for releasing the animal.

A still further object is to provide means for directing the catching and holding device in engagement with the limb of an animal, while the operator is at a distance from the animal and a still further object is to provide means for increasing or decreasing the size of the gripping parts of the device.

Other objects and advantages will be hereinafter referred to and more particularly pointed out in the claims.

In the accompanying drawings which are made a part of this application, Figure 1 is an elevation of the catching and holding device, showing the same in position to be operated by giving a pull thereto. Fig. 2 is an edge elevation thereof. Fig. 3 is a sectional view, as seen on line 3—3, Fig. 1. Fig. 4 is an elevation showing the device in position to be thrust into engagement with the limb of an animal portions thereof being in section.
Fig. 5 is an edge elevation thereof. Fig. 6 is a side elevation of a slightly modified form of catching and holding device, and, Fig. 7 is an edge elevation thereof.

Referring to the drawings in which similar reference numerals designate corresponding parts throughout the several views, 1 indicates the body of the catcher, which is preferably U-shaped, one arm 2 of which is provided with a pad 3, preferably consisting of a strip of leather laced in position on the upper end of the arm, while the arm 4 is of less length than the arm 2 and is provided with ears 5 at its upper end, between which is pivotally mounted a lever 6, said lever being of sufficient length to extend into engagement with the arm 2, when the lever is moved across the path of the U-shaped body 1, and in order to hold the lever in its inward position, a head 7 is provided for the lower end of the lever, the edge of which is provided with a plurality of teeth 8, with which is adapted to engage a plunger 9 carried in a socket 10 on the arm 4.

The plunger 9 is yieldingly held in engagement with the teeth 8 by means of a spring 11, which is interposed between the lower end of the plunger and the closed end of the socket 10, said spring surrounding a stem 12, which stem is secured at one end to the plunger 9, while the opposite end thereof extends through a bore in the lower end of the socket and has secured thereto any suitable form of tab 13, so that the plunger may be readily pulled out of engagement with the teeth 8, when it is desired to release the lever 6.

The arm 2 is provided with an opening 14, through which extends a holding strap 15, said strap being secured at one end to the upper end of the lever 6 and extended across the space between the arms 2 and 4, while the opposite end thereof is directed through an eye-bolt 16 and is anchored to a screw-eye 17 on the operating handle 18.

The closed end of the body 1 is provided with a shank 19, which is pivotally mounted between ears 20, carried by a collar 21, the eye-bolt extending through said ears and the lower end of the shank to form a pivot pin for the shank. The collar 21 is clamped around a thimble 21ª, which fits over the end of the handle 18 and the thimble is held in a fixed position on the handle by providing the handle with a cavity 22, in which is seated a stud 23 carried by the thimble, thus normally holding the thimble in a fixed relation to the handle. The shank 24 of the eye-bolt 16, forming the pivot pin for the shank 19, is also employed for clamping the collar 21 on the thimble 21ª and while the end of the shank 24 is shown as riveted, it will be readily understood that the same may be secured in any other preferred manner.

The shank 19 is adapted to be swung between the ears 20 to dispose the body from the position shown in Fig. 1 to the position shown in Fig. 4 and in order to normally hold the body in its adjusted position, a spring 25 is fixed to the thimble 21ª and the free end thereof is directed between the ears 20 and in engagement with the lower end of the shank 19, thereby directing pressure on the end of the shank, which will result in requiring some force to swing the body.

In order to cushion the upper end of the lever 6 and prevent the same from causing abrasions by coming in contact with the animal, the end of the strap 15 is inserted through an opening 26 in the upper end of the lever 6 and is then extended upwardly over the end of the lever 6 and held in this position by placing the strap through a slit 27 in that end of the strap directed over the upper end of the lever 6.

In Figs. 6 and 7 of the drawings, I have shown a slightly different construction, in that the shank 19 is dispensed with and one arm of the body portion 1 formed integral with the thimble 21ª and the lever 6, in this instance, is provided with a bifurcated end 28, which engages an arm 29 of the body 1, and, instead of having a plurality of teeth thereon, a notch 30 is provided in the bifurcated end 28, which is adapted to be engaged by a latch 31, said latch having depending ears 32, which extend to each side of the arm 29 and are secured thereto by means of a pivot pin 33, while the handle portion 34 of the latch 31 is engaged by spring 35, one end of which is fixed to the arm 29. The latch 31 is arranged to bear against the end of the lever 6 at all times and the tension of the spring 35 is such that the latch will be caused to bind on the end of the lever and normally hold said lever in its open position. This form of device is to be operated by giving a pull on the handle 18, the strap 15 being secured to the free end of the lever 6 in the usual manner, while the opposite end thereof is extended through the opening 14 in the arm 2 and the outer end thereof knotted, as shown at 36, to prevent the end of the strap from being pulled through the opening 14 the knot taking the place of the screw eye 17 for anchoring the end of the strap 15 and by locating the knot at different points in the length of the strap, the size of the loop formed by that portion of the strap between the arm 2 and end of the lever 6, will be accordingly increased or decreased.

In operation, the body 1 is directed into engagement with the limb of an animal, the arms 2 and 4 passing to each side of the limb. This will result in forcing that portion of the strap 15 across the mouth of the body 1, between the arms 2 and 4, and as one end of the strap is anchored, the lever 6 will be drawn across the mouth of the body 1, as best shown by dotted lines in Fig. 1, the strap 15 forming a loop around the limb of the animal and in order to regulate the size of the loop, the end of the strap 15 may be released from the eye 17 and the strap moved endwise through the opening 14 to increase the size of the loop when the end of the strap may be again anchored to the eye 17, and the strap may be accordingly shortened, when the loop is to be made smaller, and in that form of device shown in Figs. 6 and 7, the size of the loop may be increased or decreased by properly placing the knotted portion 36.

It will thus be seen that I have provided a very cheap and economical form of animal catching and holding device, and by providing the cushions at the ends of the arms 2 and lever 6 and forming the engaging loop of leather, the animal will not be injured when engaged by the holding device and it will further be seen that the strap may be readily adjusted to form loops of different sizes. It will further be seen that by providing the handle 18, the device may be placed in engagement with the limb of an animal without the operator approaching near enough to the animal to frighten the same.

What I claim is:

1. A catching and holding device of the class described, comprising a body having arms, ears on one of said arms, a lever pivotally and adjustably mounted between said ears, a head at the pivoted end of said lever, teeth on said head, a plunger adapted to engage said teeth and hold the lever in its adjusted position, means to release said plunger from the teeth, a shank on said body, a handle, means to secure said handle to the shank, a strap extending across the space in said body and engaging the free end of said lever, said strap forming a cushion over the end of said lever, one of the arms of the body having an opening therethrough to receive the strap and means to anchor the end of the strap, whereby a loop will be formed between the arms when the device is directed into engagement with an object.

2. The herein described catching and holding device, comprising a body, arms on said body, one of said arms having an opening therein, ears at the free end of the opposite arm, a lever pivotally and adjustably mounted between said ears, a head on the pivoted end of the lever, teeth on said head, a plunger adapted to engage said teeth and hold the lever in its adjusted position, means to release the plunger from the teeth, a shank on said body, a handle, a collar adapted to surround said handle, ears on said collar to receive said handle and eye-bolts adapted to clamp the collar on the handle and form a pivot for said shank, a strap adapted to extend through the opening in the arm and engage the upper end of said lever, said strap forming a cushion for the upper end of the lever, the opposite end of said strap being extended through said eye-bolts and anchored to the handle, whereby a loop will be formed in the strap between said arms when the body is directed into engagement with an object.

3. A catching and holding device of the class described, comprising a substantially U-shaped body, arms extending from said body, one of said arms having an opening therethrough, a lever pivotally and adjustably secured to one of said arms, means to hold said lever in its adjusted position, a strap extending through said opening in the arm and across the space in the body, a cushion at the upper end of said lever, formed by extending said strap over the end of the lever, and means to anchor the end of the strap extending through the opening in the arm.

4. A catching and holding device of the class described, comprising a substantially U-shaped body, paralleling arms extending from said body, one of said arms having an opening therethrough, a lever pivotally secured to one of said arms, means to hold said lever in its open or closed position, a strap extending through the opening in the arm and across the space in the body, one end of said strap being extended over the upper end of said lever to form a cushion, said strap being adapted to be adjusted longitudinally, whereby the length of that portion of the strap between the arm and the end of the lever may be increased or decreased.

In testimony whereof I have signed my name to this specification in the presence of two subscribing witnesses.

ELLET L. HITT.

Witnesses:
JOHN PALMER,
HENRY OTTMAN.